(12) United States Patent
Schwerdtfeger (10) Patent No.: US 8,764,018 B2
(45) Date of Patent: Jul. 1, 2014

(54) SEAL ARRANGEMENT, ESPECIALLY FOR HIGH PRESSURE APPLICATIONS, PREFERABLY FOR USE IN $CO_2$ COMPRESSORS

(75) Inventor: Markus Schwerdtfeger, Mannheim (DE)

(73) Assignee: KACO GmbH & Co. KG, Heilbronn (DE)

( * ) Notice: Subject to any disclaimer, the term of this patent is extended or adjusted under 35 U.S.C. 154(b) by 993 days.

(21) Appl. No.: 12/249,506

(22) Filed: Oct. 10, 2008

(65) Prior Publication Data
US 2009/0096175 A1    Apr. 16, 2009

(30) Foreign Application Priority Data

Oct. 11, 2007   (DE) .......................... 10 2007 050 349

(51) Int. Cl.
*F16J 15/32* (2006.01)
(52) U.S. Cl.
USPC .......................................... 277/394; 277/353
(58) Field of Classification Search
USPC .................. 277/349, 351, 353, 394
See application file for complete search history.

(56) References Cited

U.S. PATENT DOCUMENTS

| | | | |
|---|---|---|---|
| 3,511,513 A * | 5/1970 | Dahlheimer | 277/353 |
| 3,947,944 A | 4/1976 | Washington | |
| 4,416,458 A | 11/1983 | Takenaka et al. | |
| 4,483,540 A * | 11/1984 | Bordien et al. | 277/364 |
| 4,515,376 A | 5/1985 | Okamuro | |
| 5,188,377 A * | 2/1993 | Drumm | 277/353 |
| 5,336,047 A * | 8/1994 | Kolhouse | 415/168.2 |
| 6,589,022 B2 * | 7/2003 | Yokomachi et al. | 417/222.2 |
| 7,066,467 B2 * | 6/2006 | Sakata | 277/351 |
| 2003/0122315 A1 | 7/2003 | Feigl | |
| 2004/0164495 A1 * | 8/2004 | Oldenburg | 277/353 |

FOREIGN PATENT DOCUMENTS

| | | | |
|---|---|---|---|
| DE | 19 54 712 | 2/1967 | |
| DE | 16 75 055 | 11/1970 | |
| DE | 33 24 468 A1 | 1/1985 | |
| EP | 1055849 A2 * | 11/2000 | F16J 15/32 |
| GB | 1 446 275 | 8/1976 | |
| JP | 52-071109 | 5/1977 | |
| JP | 02-107794 | 8/1990 | |
| WO | 2006/111137 A1 | 10/2006 | |

* cited by examiner

*Primary Examiner* — Gilbert Lee
(74) *Attorney, Agent, or Firm* — Gudrun E. Huckett

(57) ABSTRACT

A seal arrangement has a mechanical shaft seal with an annular counter member and a slide ring each having sliding surfaces that rest against one another and define sealing gap. The sealing gap has at least one sealing lip correlated therewith. The sealing lip is arranged downstream or upstream of the sealing gap.

6 Claims, 7 Drawing Sheets

SEAL ARRANGEMENT, ESPECIALLY FOR HIGH PRESSURE APPLICATIONS, PREFERABLY FOR USE IN CO₂ COMPRESSORS

BACKGROUND OF THE INVENTION

The invention relates to a seal arrangement, in particular for high-pressure applications, preferably for use in $CO_2$ compressors, comprising a mechanical seal comprised of a slide ring and an annular counter member, wherein the slide ring and annular counter member rest with their sliding surfaces against one another and define a sealing gap.

In known seal arrangements that are used in particular in high-pressure applications, a mechanical shaft seal is used. The sealing gap between the annular counter member and the slide ring seals the medium and prevents its escape. In particular, during the initial running-in of the sealing surfaces of annular counter member and slide ring there is the problem that as a result of not yet properly seated (run-in) sealing surfaces excess leakage is observed. For this reason, the slide ring is pressed with an appropriately great force against the annular counter member in order to improve the seal-tightness of the sealing gap. The increased pressing force causes higher wear of the mechanical shaft seal parts.

SUMMARY OF THE INVENTION

It is an object of the present invention to design a seal arrangement of the aforementioned kind in such a way that a high seal-tightness is ensured in particular in the initial running-in time of the sliding surfaces of the slide ring and the annular counter member of the mechanical shaft seal.

In accordance with the present invention, this is achieved in that the sealing gap has correlated therewith at least one sealing lip.

In the seal arrangement according to the invention by means of the additional sealing lip the seal-tightness of the arrangement is increased. In particular during the initial running-in of the sliding surfaces of annular counter member and slide ring this sealing lip is particularly advantageous because it reliably catches medium that has escaped through the sealing gap. As a result of the sealing lip the pressing force with which the two sliding partners of the mechanical shaft seal are forced against one another can be relatively small so that wear of the sliding partners is also correspondingly reduced.

DESCRIPTION OF THE PREFERRED EMBODIMENTS

Figure 1:
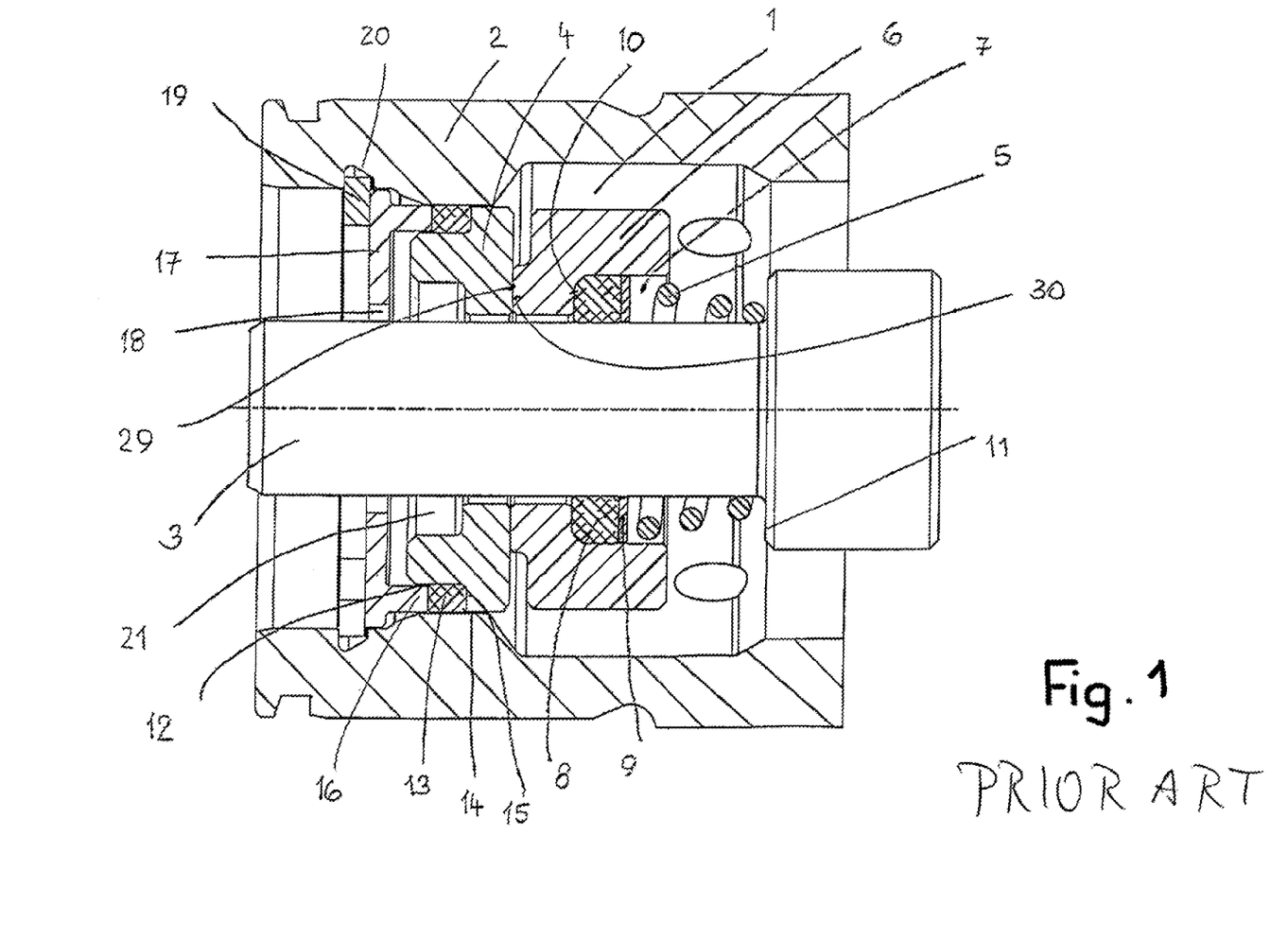
FIG. 1 shows an axial section of a seal arrangement according to the prior art.

FIG. 1 shows a seal arrangement in the form of a mechanical seal according to the prior art. The mechanical seal is designed for high-pressure applications, in particular for $CO_2$ compressors. The seal arrangement is located in a mounting space 1 of a housing 2. A machine part 3 to be sealed, such as a shaft, projects through the mounting space 1. The seal arrangement has an annular counter member 4 against which a slide ring 6 rests seal-tightly under the force of at least one pressure spring 5. The slide ring 6 surrounds the machine part 3 at a minimal spacing and has its inner side an annular recess 7 in which a driving collar 8 is positioned with which the slide ring 6 is fixedly connected to the machine part 3. The driving collar 8 is comprised e.g. of rubber and is axially secured in the mounted position by a securing ring 9 in the recess 7. The driving collar 8 rests against the radial end face 10 that is proximal to the annular counter member 4. On the securing ring 9 a first end of the pressure spring 5 is resting while the second end of the spring 5 is supported on a radial shoulder 11 of the machine part 3. The radial shoulder 11 is positioned at an axial spacing relative to the slide ring 6.

The annular counter member 4 surrounds the machine part 3 at a spacing and has a recess 12 in its outer wall that is axially open in a direction opposite to the recess 7 of the slide ring 6. In the recess 12 a sealing ring 13 is positioned that provides a static sealing action of the annular counter member 4 on the wall 14 of the mounting space 1. The sealing ring 13 rests against a radial end face 15 of the recess 12. At the axial opposite end face of the sealing ring 13 an annular projection 16 of a support disk 17 is positioned. The support disk 17 has a central opening 18 through which the machine part 3 projects. The diameter of the opening 18 is greater than the outer diameter of the machine part 3 in the area of the opening 18. The support disk 17 is axially secured by a securing ring 19 that engages an annular groove 20 in the inner wall 14 of the mounting space 1.

The mounting space 1 has in the area of the slide ring 6 a greater diameter than in the area of the annular counter member 4. In the illustrated embodiment, the annular counter member 4 and the slide ring 6 have the same outer and inner diameters. The annular counter member 4 has at its inner circumferential surface a further annular recess 21 that is open in the direction toward the support disk 17.

Figure 2:
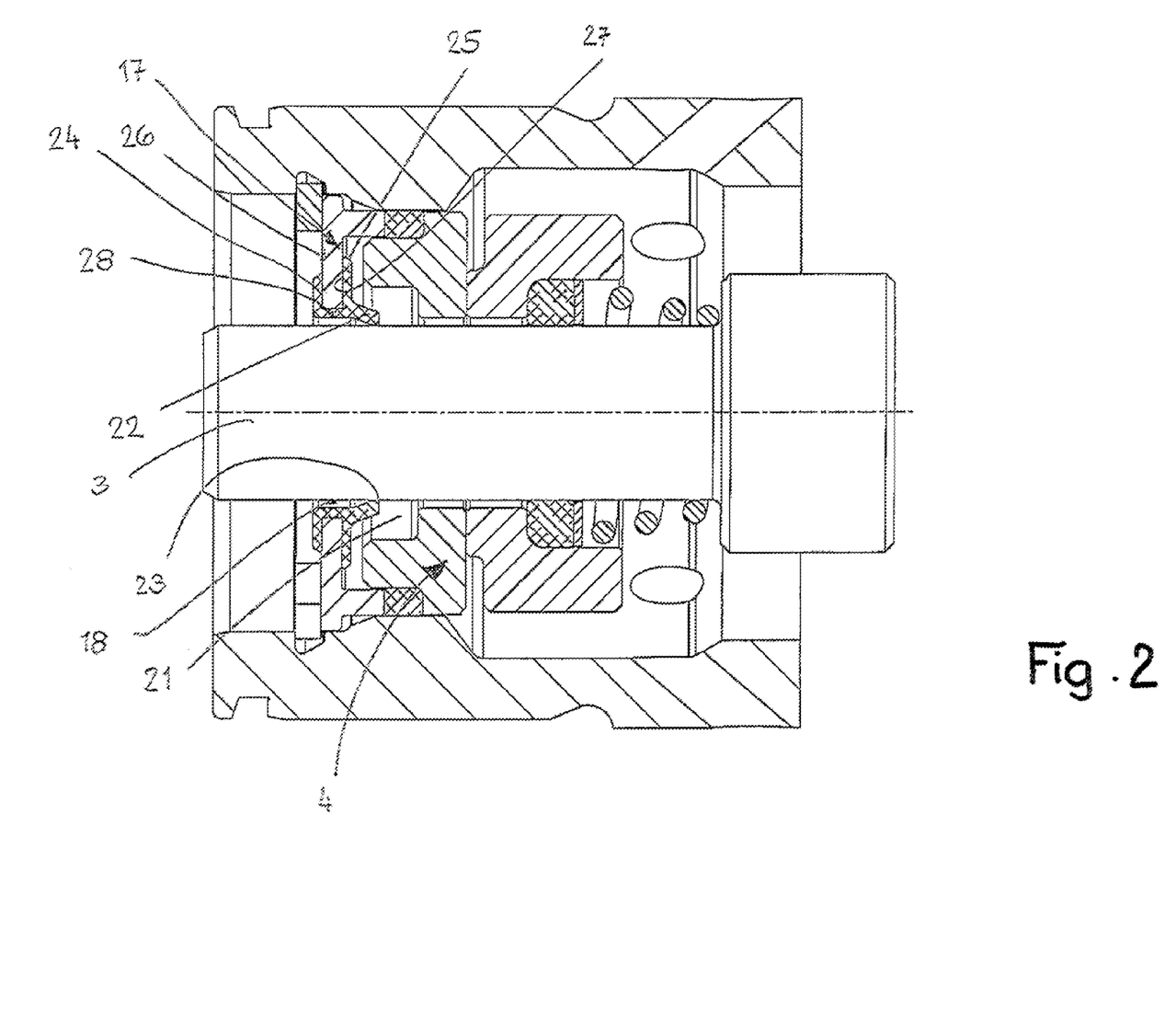
FIG. 2 illustrates a first embodiment of the seal arrangement according to the present invention.

In the seal arrangement according to FIG. 2, a sealing lip 22 is provided for improving the sealing action; the sealing lip 22 rests with a sealing edge 23 under radial pretension against the machine part 3. The sealing lip 22 projects into the recess 21 of the annular counter member 4.

The sealing lip 22 is integrally formed with two securing parts 24, 25 that cover the support disk 17 at both lateral surfaces 26, 27 across a part of their radial width. The two securing parts 24, 25 are connected to one another by an annular intermediate layer 28 that covers the rim of the opening 18 of the support disk 17. In other respects, this seal arrangement is of identical configuration as the arrangement according to FIG. 1 so that in regard to the further configuration of the seal arrangement of FIG. 2 reference is being had to the description of FIG. 1.

The sealing lip 22, the securing parts 24, 25, and the intermediate layer 28 are comprised of material that is conventionally used for such sealing purposes, i.e., elastomeric plastic material, rubber, or rubber like materials and the like. The sealing lip 22 provides an improved static and dynamic sealing action, particularly during the initial running-in time of the sealing surfaces 29, 30 of the annular counter member 4 and the slide ring 6. The sealing lip 22 prevents in this case that between the sliding surfaces 29, 30 medium can pass to the exterior. Since the sealing lip 22 is part of the support disk 17, a very cost-efficient configuration results. Moreover, the space requirement for the sealing lip 22 is minimal. Since the mechanical shaft seal has arranged downstream thereof the sealing lip 22, the axial pressing force generated by the pressure spring 5 between the annular counter member 4 and the slide ring 6 can be reduced because medium that has possibly escaped between the sliding surfaces 29, 30 is caught by the sealing lip 22. The use of the sealing lip 22 prevents also oil-based carbon deposits at the air side of the seal arrangement, In the seal arrangement according to FIG. 3 the sealing lip 22 is formed as an integral part of the sealing ring 13 with securing part 25 arranged therebetween. Accordingly, the securing part 25 covers the lateral surface 27 of the support disk 17 completely. Also, the cylindrical innerside 31 of the annular projection 16 of the support disk 17 is completely covered by the integral member 13, 22, 24, 25. In other respects, the seal arrangement according to FIG. 3 is identical to the embodiment of FIG. 2.

Since the static sealing ring 13 and the sealing lip 22 are integrally formed, an especially simple manufacture of the seal arrangement is provided because the sealing lip 22 with the securing parts 24, 25 as well as the sealing ring 13 can be produced on the support disk 17 in one working step. In this way, mounting of the seal arrangement is also simplified because the sealing lip 22 as well as the sealing ring 13 are present on the support disk 17 and can be mounted together with the support disk in a single mounting step. Since it is not provided as a separate component, the sealing ring 13 also cannot be lost.

Figure 3:
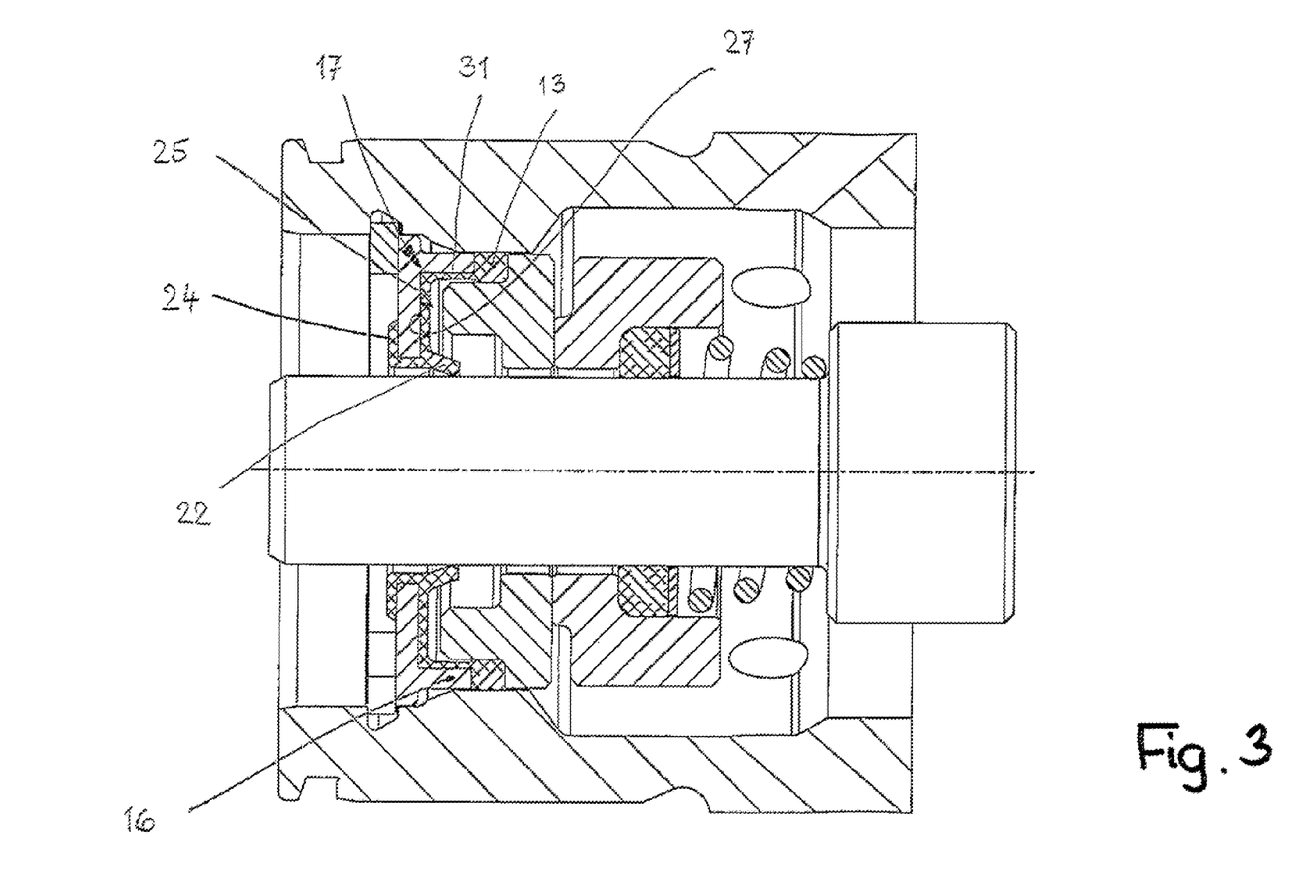
FIG. 3 illustrates a second embodiment of the seal arrangement according to the present invention.
Figure 4:
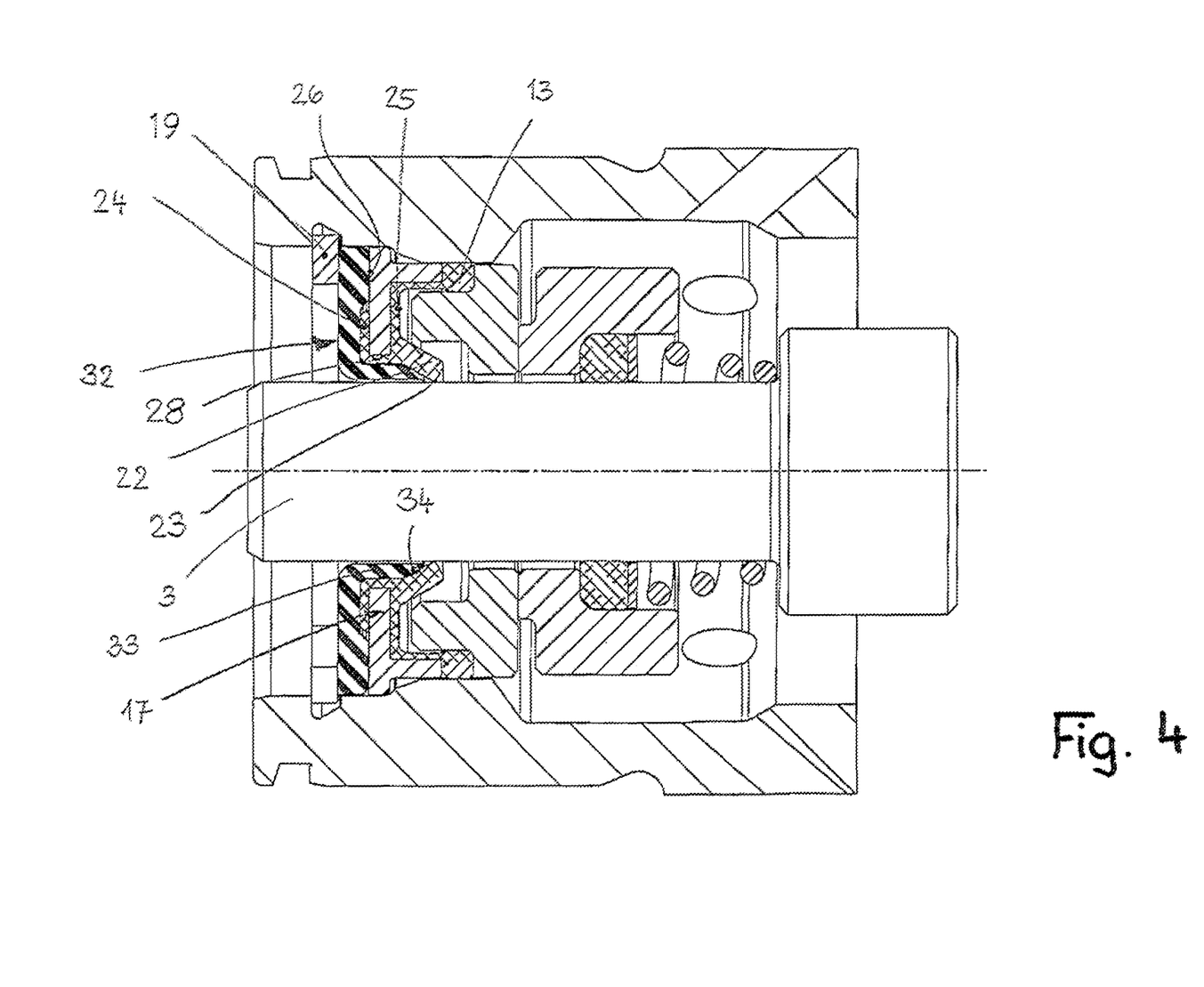
FIG. 4 illustrates a third embodiment of the seal arrangement according to the present invention.

The seal arrangement according to FIG. 4 corresponds substantially to the embodiment according to FIG. 3. The sealing lip 22 is again an integral part with the securing parts 24, 25 and the sealing ring 13. In addition, between the securing ring 19 and the support disk 17 there is a pressure support means 32 that completely covers the support disk 17 on the outer lateral surface 26. The pressure support means 32 extends into close vicinity of the machine part 3 (see FIG. 4) so that the machine part 3 is surrounded at a minimal radial spacing by a sleeve section 33 of the pressure support means 32. The securing part 24 and the intermediate layer 28 are covered by the pressure support means 32. The sleeve section 33 has a conical end face 34. The end face 34 is configured such that the sealing lip 22 rests with its conical surface facing the machine parts 3 on the end face 34 in areal contact. The sleeve section 33 ends at a spacing before the sealing edge 23 of the sealing lip 22 so that the sealing lip 22 can rest sealtightly with sufficient radial force against the machine part 3.

As a result of the pressure support means 32 that is of elastic material, an optimal support of the sealing lip 22 at high pressures is ensured so that the service life of the sealing lip 22 is significantly increased. The pressure support means 32 and the sealing lip 22 are comprised of different materials so that the two elements are optimally adjusted to their task, respectively. The pressure support means 32 is comprised in particular of metal, plastic material and the like.

Figure 5:
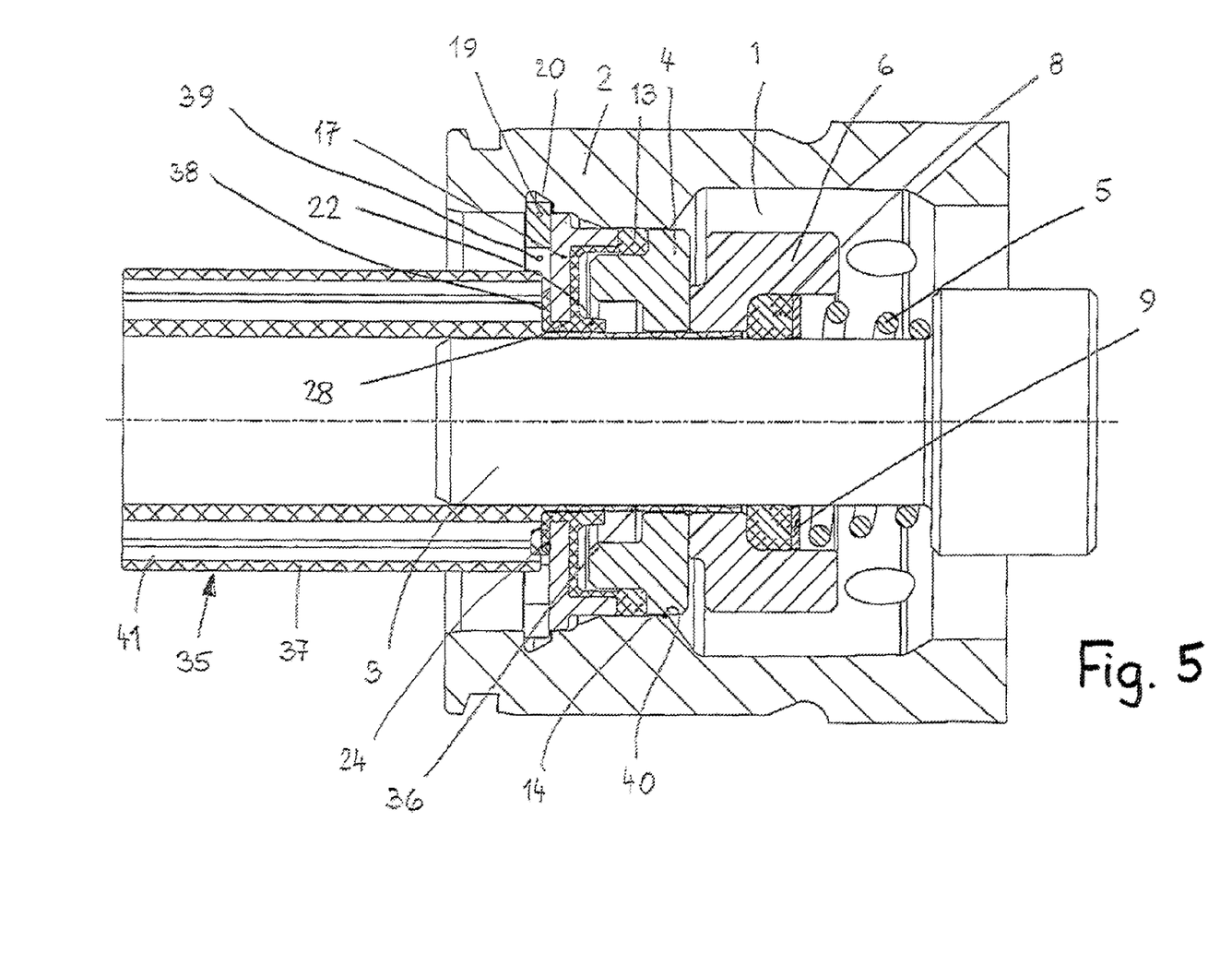
FIG. 5 shows the seal arrangement according to FIG. 3 pressed into the housing by means of a mounting sleeve.

FIG. 5 shows the seal arrangement according to FIG. 3 that is pressed by means of a mounting sleeve 35 into the mounting space 1 of the housing 2. The mounting sleeve 35 has a tubular projection 36 that has a thin wall. It has such a wall thickness that it can be inserted between the machine part 3 and the annular counter member 4 as well as the slide ring 6.

Before mounting, the support disk 17 with the sealing lip 22, the annular counter member 4, and the slide ring 6 are pushed onto the tubular projection 26. The sealing lip 22 is elastically deformed when doing so. The projection 36 is of such a length that it ends at a minimal spacing before the driving collar 8. At the transition from the tubular projection 36 to the pressing part 37 the mounting sleeve 35 is provided with a radial contact surface 38 that rests on the securing part 24. The outer diameter of this pressing part 37 is smaller than the opening 39 of the securing ring 19 so that a problem-free assembly of the seal arrangement is ensured.

The mounting sleeve 35 is comprised of an injection-moldable plastic material with sufficient strength in order to be able to press the seal arrangement into the mounting space 1.

The tubular projection 36 can be designed such that the support disk 17, the annular counter member 4, and the slide ring 6 are seated with slight pretension on the tubular projection 36. This has the advantage that these elements during transport and mounting cannot be displaced relative to one another. In this way, in particular the sealing gap between the annular counter member 4 and the slide ring 6 remains closed so that the sealing surfaces cannot become soiled.

After having pushed the support disk 17, the annular counter member 4, and the slide ring 6 onto the tubular projection 36, the seal arrangement is pushed onto the machine part 3. By means of the mounting sleeve 35 the seal arrangement is pressed into the mounting space 1; the annular counter member 4 with its outer cylinder wall 40 contacts the wall 14 of the mounting space 1. In the mounted position the annular counter member 4 is seated with press fit in the bore (mounting space) 1. The sealing ring 13 provides static sealing action in the area of the outer wall surface 40 of the annular counter member 4. Before the mounting sleeve 35 is pushed onto the machine part 3, the pressure spring 5 and the driving collar 8 with securing ring 9 are pushed onto the machine part 3. During the mounting process, these parts are moved into the mounted position by means of the slide ring 6.

Since the opening 39 of the securing ring 19 has a greater diameter than the mounting sleeve 35, the sealing ring 19 can be pushed over the mounting sleeve 35 and locked in the annular groove 20 as soon as the pressing step has been completed. Once the securing ring 19 is mounted, the mounting sleeve 35 is retracted.

By means of the mounting sleeve 35, the entire mechanical shaft seal 4, 6 can be very easily mounted in a single working step. The sealing surfaces and/or sealing edges, inasmuch as necessary, can be prelubricated. As a result of the simple assembly, the risk of installation errors is minimal.

By means of the mounting sleeve, when an appropriate design is provided, even automatic mounting of the seal arrangement is possible. The mounting sleeve 35 can moreover be designed such that it receives the securing ring 19. It is then not necessary to mount the securing ring 19 in an additional mounting step after the seal arrangement has been pressed into place.

The radial contact surface 38 of the mounting sleeve 35 is designed such that it axially supports the securing part 24 at the transition to the intermediate layer 28. The mounting sleeve 35 can have through openings 41 that are advantageously distributed about its circumference; they are provided within the pressing part 37 and distributed circumferentially about the mounting sleeve 35.

The mounting sleeve 35 is usable multiple times because it is not destructed upon mounting of the seal arrangement but can be removed without problem from the machine part 3 to be sealed.

Figure 6:
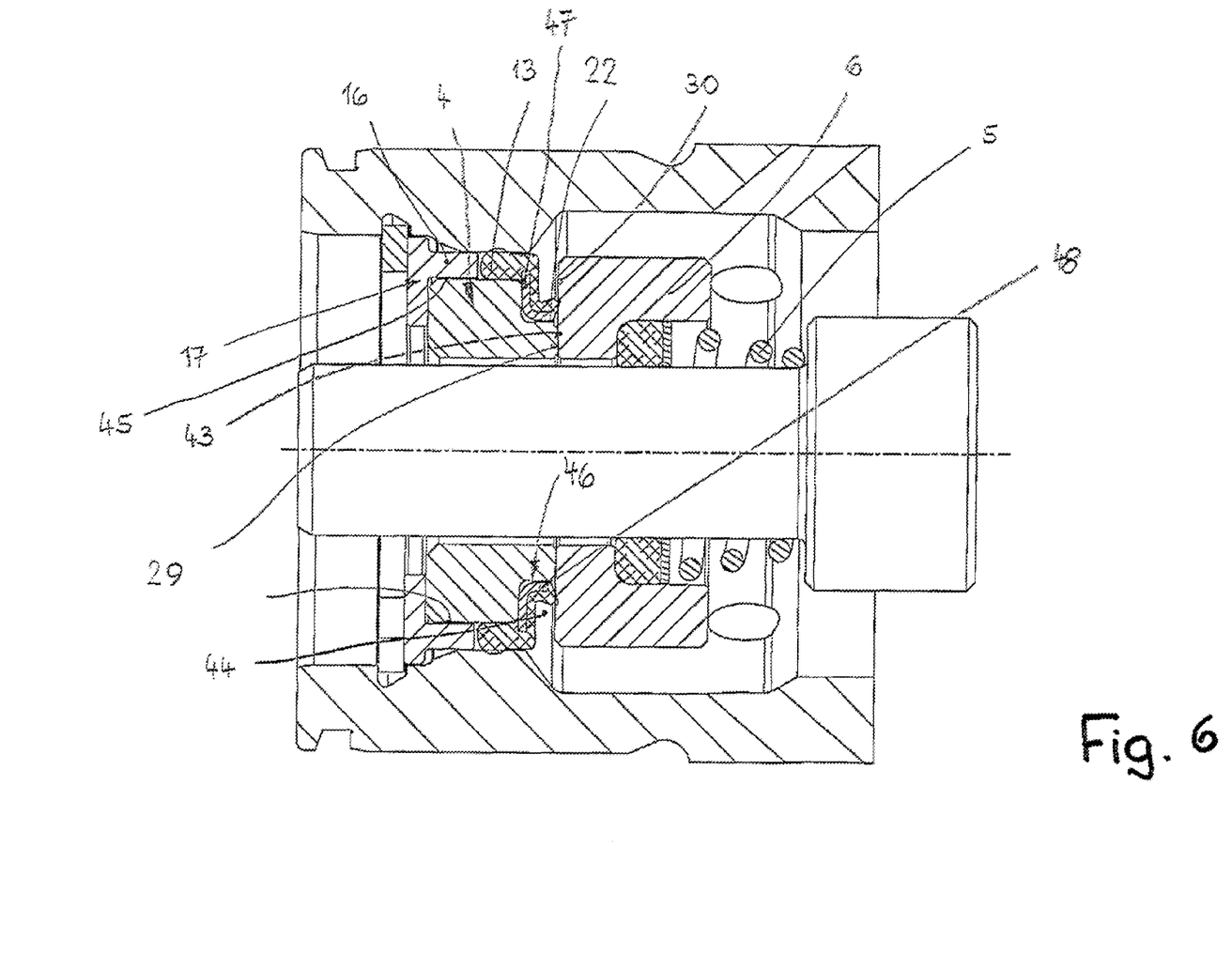
FIG. 6 illustrates a fourth embodiment of the seal arrangement according to the present invention.

FIG. 6 shows a seal arrangement in which the sealing lip 22 seals in the axial direction. It rests against the radial sliding surface 30 of the slide ring 6 in the area radially outside of the dynamic sealing gap 43 between the annular counter member 4 and the slide ring 6. In contrast to the preceding embodiments, the annular counter member 4 no longer has the radially inwardly open recess 21 but a recess 44 that is provided in the sliding surface 29 of the annular counter member 4. The recess 44 is radially open in the outward direction. The annular projection 16 of the support disk 17 rests against the outer cylindrical wall 45 of the annular counter member 4. The projection 16 extends approximately about half the axial length of the wall surface 45 where the sealing ring 13 rests adjacent to the projection 16. The sealing ring 13 and the sealing lip 22 form an integral part.

In the recess 44 there is a support member 46 that in axial section has an L-shape and that rests against the walls delimiting the recess 44; the support member 46 supports the sealing lip 22. In other respects, the seal arrangement is identical to that of the preceding embodiments.

The support member 46 projects with its radially extending section 47 slightly past the wall surface 45 of the annular counter member 4. The axial annular section 48 of the support body 46 ends at a minimal spacing before the slide ring 6. The radial section 47 is covered by the material of the sealing ring 13 or the sealing lip 22.

The sealing lip 22 ensures a high dynamic sealing action, in particular during the initial running-in time of the two sliding surfaces 29, 30 of the annular counter member 4 and the slide ring 6. In contrast to the preceding embodiment, the sealing lip 22 is arranged upstream of the sealing gap 43 of the mechanical shaft seal so that passage of medium to be sealed through the sealing gap 43 is prevented. Especially in the initial running-in time of the sliding surfaces 29, 30 this position of the sealing lip 22 is advantageous because the medium to be sealed is prevented from entering the sealing gap 43. Since the sealing lip 22 is an integral part of the sealing ring 13, an inexpensive embodiment results. Moreover, the space requirement is minimized. As a result of the sealing lip 22, the pressing force with which the slide ring 6 is forced against the annular counter member 4 by the pressure spring 5 can be reduced also because the sealing lip 22 contributes to the sealing action in addition to the sealing gap 43.

For mounting the seal arrangement, the mounting sleeve 35 (FIG. 5) can be used in the described way.

Figure 7:
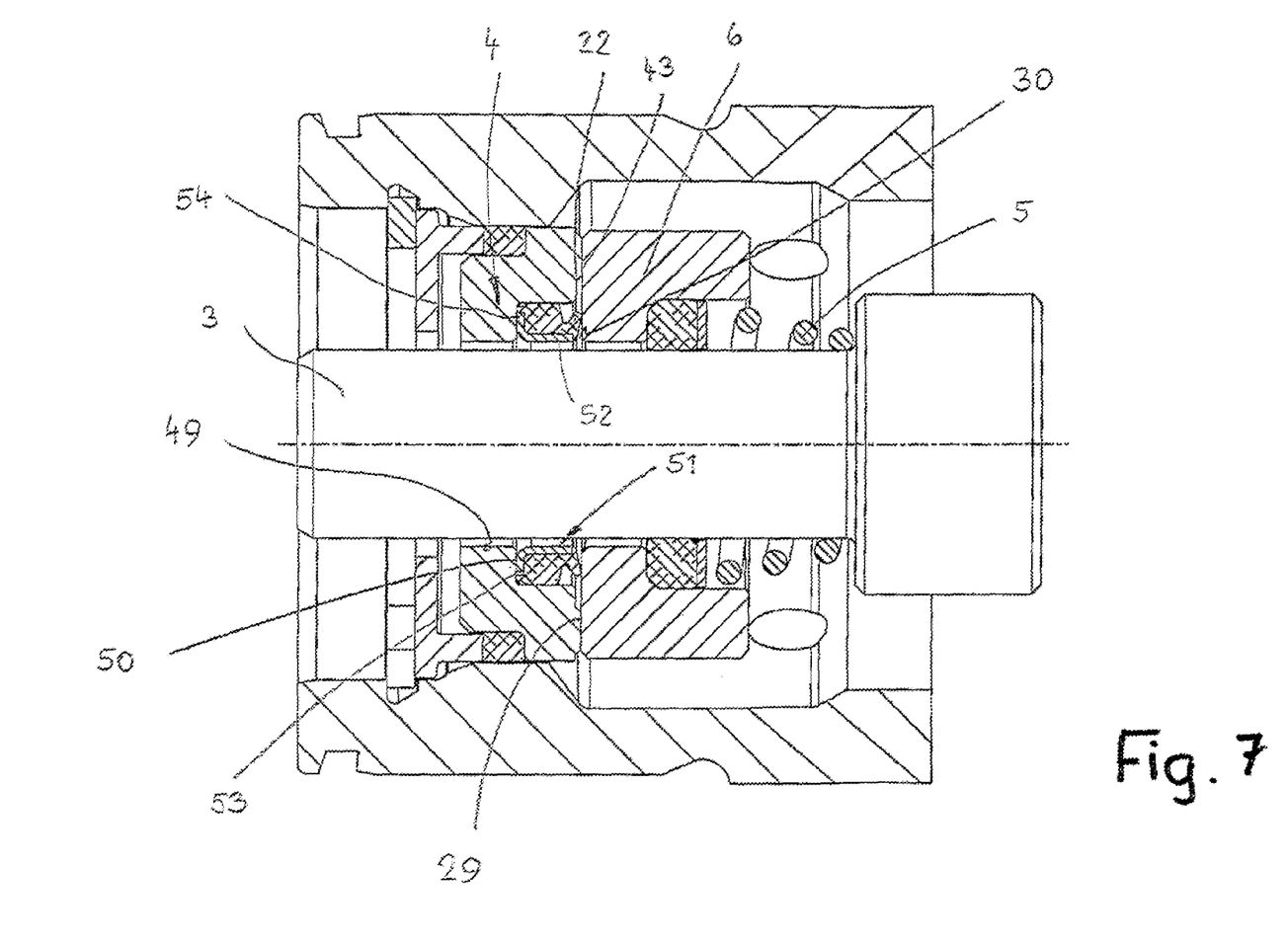
FIG. 7 illustrates a fifth embodiment of the seal arrangement according to the present invention.

In the seal arrangement according to FIG. 7 the annular counter member 4 is provided on its inner cylindrical wall surface 49 with a recess 15 that is open toward the slide ring 6 in which the sealing lip 22 is arranged. It is positioned in the area outside of the sealing gap 43 on the sliding surface 30 of the slide ring 6 in a seal-tight way. Relative to the machine part 3 to be sealed, the sealing lip 22 is covered by a support member 51 that has an L-shaped cross-section. The support body 51 has a sleeve part 52 that surrounds the machine part 3 at a spacing. The sleeve part 52 passes into an outwardly oriented radial part 53 that rests against the a radial end face 54 of the recess 50. By means of the support member 51 the sealing lip 22 is supported against pressure so that the seal arrangement can be used also for high-pressure applications. The sealing lip 22 ensures improved static and dynamic seal-tightness in particular during the running-in time of the sliding surfaces 29, 30 of the annular counter member 4 and of the slide ring 6. Since the sealing lip 22 is arranged within the cross-section of the annular counter member 4, an additional mounting space for the sealing lip is not required. In this way, the seal arrangement requires only minimal space. Also, the seal arrangement can be produced inexpensively. Since the sealing lip 22 is arranged downstream of the sealing gap 43 between the annular counter member 4 and the slide ring 6, the pressing force with which the slide ring 6 is forced by the pressure spring 5 against the annular counter member 4 can be reduced. As in the preceding embodiments, the seal arrangement reduces carbon deposits at the air side of the seal arrangement as a result of the described configuration.

The support member 51 is arranged in such a way in the recess 15 of the annular counter member 4 that it does not project radially inwardly past the annular counter member 4. In this way, the mounting sleeve 35 can be used for mounting the seal arrangement.

The specification incorporates by reference the entire disclosure of German priority document 10 2007 050 349.2 having a filing date of Oct. 11, 2007.

While specific embodiments of the invention have been shown and described in detail to illustrate the inventive principles, it will be understood that the invention may be embodied otherwise without departing from such principles.

What is claimed is:

1. A seal arrangement comprising:
a mechanical seal comprised of a stationary annular counter member and a slide ring that is fixedly connected to a rotating machine part to be sealed by the seal arrangement;
wherein the annular counter member has a first radial end face and the slide ring has a second radial end face that faces the first radial end face;
wherein the first and second radial end faces form sliding surfaces that are forced by a pressing force to rest flat against one another and define a sealing gap extending in a radial plane;
a sealing ring surrounding externally the annular counter member and resting seal-tightly against an inner wall of a mounting space of the seal arrangement;
a support disk that is disposed in the mounting space of the seal arrangement and secures axially the annular counter member in the mounting space;
at least one sealing lip directly connected to the support disk, wherein the at least one sealing lip is arranged downstream of the sealing gap on a side of the sealing gap where the annular counter member is located;
wherein the at least one sealing lip is disposed on a face of the support disk that is facing the annular counter member, wherein the at least one sealing lip projects away from the face into a recess of the annular counter member and rests against the rotating machine part within the recess;
wherein the at least one sealing lip provides a sealing action during initial running-in of the sliding surfaces of the annular counter member and the slide ring.

2. The seal arrangement according to claim 1, wherein the sealing ring is a static seal for the mechanical seal.

3. The seal arrangement according to claim 2, wherein the sealing ring is positioned axially between the support disk and the annular counter member so that the support disk rests with intermediate positioning of the sealing ring against the annular counter member.

4. The seal arrangement according to claim 1, further comprising a pressure support means that supports the at least one sealing lip.

5. A seal arrangement comprising:
a mechanical seal comprised of a stationary annular counter member and a slide ring that is fixedly connected to a rotating machine part to be sealed by the seal arrangement;
wherein the annular counter member has a first radial end face and the slide ring has a second radial end face that faces the first radial end face;
wherein the first and second radial end faces form sliding surfaces that are forced by a pressing force to rest flat against one another and define a sealing gap extending in a radial plane;

a sealing ring surrounding externally the annular counter member and resting seal-tightly against an inner wall of a mounting space of the seal arrangement;

a support disk that is disposed in the mounting space of the seal arrangement and secures axially the annular counter member in the mounting space;

at least one sealing lip directly connected to the support disk, wherein the at least one sealing lip is arranged downstream of the sealing gap on a side of the sealing gap where the annular counter member is located and the at least one sealing lip rests against the rotating machine part;

wherein the at least one sealing lip provides a sealing action during initial running-in of the sliding surfaces of the annular counter member and the slide ring;

wherein the sealing ring is a static seal for the mechanical seal;

wherein the at least one sealing lip and the sealing ring are jointly formed as a monolithic part.

6. A seal arrangement comprising:

a mechanical seal comprised of a stationary annular counter member and a slide ring that is fixedly connected to a rotating machine part to be sealed by the seal arrangement;

wherein the annular counter member has a first radial end face and the slide ring has a second radial end face that faces the first radial end face;

wherein the first and second radial end faces form sliding surfaces that are forced by a pressing force to rest flat against one another and define a sealing gap extending in a radial plane;

a sealing ring surrounding externally the annular counter member and resting seal-tightly against an inner wall of a mounting space of the seal arrangement;

a support disk that is disposed in the mounting space of the seal arrangement and secures axially the annular counter member in the mounting space;

at least one sealing lip connected to the support disk, wherein the at least one sealing lip is arranged downstream of the sealing gap and rests against the rotating machine part;

wherein the annular counter member has an annular recess in which the sealing ring is disposed and wherein the support disk has an axially extending annular projection that projects into the annular recess.

* * * * *